United States Patent

[11] 3,629,862

[72] Inventor Woo F. Chow
Berkeley Heights, N.J.
[21] Appl. No. 858,780
[22] Filed Sept. 17, 1969
[45] Patented Dec. 21, 1971
[73] Assignee Bell Telephone Laboratories, Incorporated
Murray Hill, Berkeley Heights, N.J.

[54] STORE WITH ACCESS RATE DETERMINED BY EXECUTION TIME FOR STORED WORDS
7 Claims, 2 Drawing Figs.

[52] U.S. Cl. .......... 340/172.5
[51] Int. Cl. .......... G06f 9/00
[50] Field of Search .......... 340/172.5; 235/157

[56] References Cited

UNITED STATES PATENTS

| | | | |
|---|---|---|---|
| 3,254,329 | 5/1966 | Lukoff et al. | 340/172.5 |
| 3,260,997 | 7/1966 | Arndt et al. | 340/172.5 |
| 3,266,020 | 8/1966 | Cheney et al. | 340/172.5 |
| 3,374,471 | 3/1968 | Smith | 340/172.5 |
| 3,426,330 | 2/1969 | Marx et al. | 340/172.5 |

OTHER REFERENCES

IBM Technical Disclosure 126 Vol. 10 No. 2 July 1967, " Instruction Prefetching Interlock"

*Primary Examiner*—Paul J. Henon
*Assistant Examiner*—Mark Edward Nusbaum
*Attorneys*—R. J. Guenther and Kenneth B. Hamlin

ABSTRACT: The long term effective access time of a single store is reduced by applying successive access drives at a rate which is greater than the rate normally permitted by the memory access-to-readout period. Processor instructions which are read out of the store are decoded and utilized to effect a temporary suspension in the application of access signals during the execution of each instruction requiring an execution time in excess of the access drive rate.

INVENTOR
W. F. CHOW
BY
[signature]
ATTORNEY

STORE WITH ACCESS RATE DETERMINED BY EXECUTION TIME FOR STORED WORDS

BACKGROUND OF THE INVENTION

1. Field of the Invention

This invention relates to a store access system and deals in particular with an arrangement for reducing the effective access time for the store.

2. Prior Art

In the present state of the data-processing art, store access time is often relatively long as compared to the time required to execute many types of instructions that may be read out of the store. Several techniques are known in the art for alleviating this impediment. One is to interleave the operations of plural stores so that they may operate at the same time but in different phases to make instructions available to a processor at a rate which is more compatible to the average instruction execution rate of the processor than would otherwise be the case for any single one of those stores. It is also known to read out a large block of instructions simultaneously into an array of temporary storage registers from which the individual instructions can be separately extracted at a rate which is substantially higher than the rate at which individual instructions would otherwise be available from the store.

It is apparent that operations in which the functions of a plurality of stores are interleaved, or in which a block of instructions are read out in parallel, require substantial hardware expenditures for implementation.

It is also known in the data-processing art to overlap, in a time sense, diverse processor operations which could be performed by separate equipments in order to save processor operating time. However, such overlapping operations must be effected by a substantial increase of hardware in combination with either program design or permanently wired-in circuit arrangements. The latter arrangements are rather inflexible since they do not take into account all possible variations in execution times, and the former is inconvenient because its proper utilization requires a diversion of the programmer's attention from his principal problem at hand to the secondary problem of reducing machine time. Thus, neither of the latter techniques is conveniently applicable to the reduction of access time for a store system which operates in conjunction with a data processor.

It is, therefore, one object of the present invention to reduce effective access time of a store system without the necessity for large increases in the hardware requirements.

It is a further object to reduce the operating times for data-processing systems.

SUMMARY OF THE INVENTION

The foregoing and other objects of the invention are realized in an illustrative embodiment in which access signals are applied to a store at a normal rate which is appropriate for the shortest processing time for words that may be read out of the store in response to such signals, but which rate results in an access drive period that is much less than the store access-to-readout period. When words which require an execution time that is longer than the access drive period are read out of the store, they are detected; and the resulting signal is utilized to suspend temporarily the supply of access signals to the store.

It is one feature of the invention that outputs from the instruction decoder of a processor which is operated in conjunction with the store are utilized to initiate the suspension of access signals.

It is another feature that sequencing circuits of the processor are arranged to provide a further output signal for restarting the flow of access signals at an appropriate time near the end of the instruction execution sequence.

Yet another feature of the invention is that successive store accessing operations are carried on simultaneously in different time phases independently of the store address which is being accessed by any of the simultaneous access operations.

BRIEF DESCRIPTION OF THE DRAWING

The foregoing and other objects and features of the invention may be more readily understood from a consideration of the following detailed description when taken in connection with the appended claims and the attached drawing in which:

DETAILED DESCRIPTION

Figure 1:
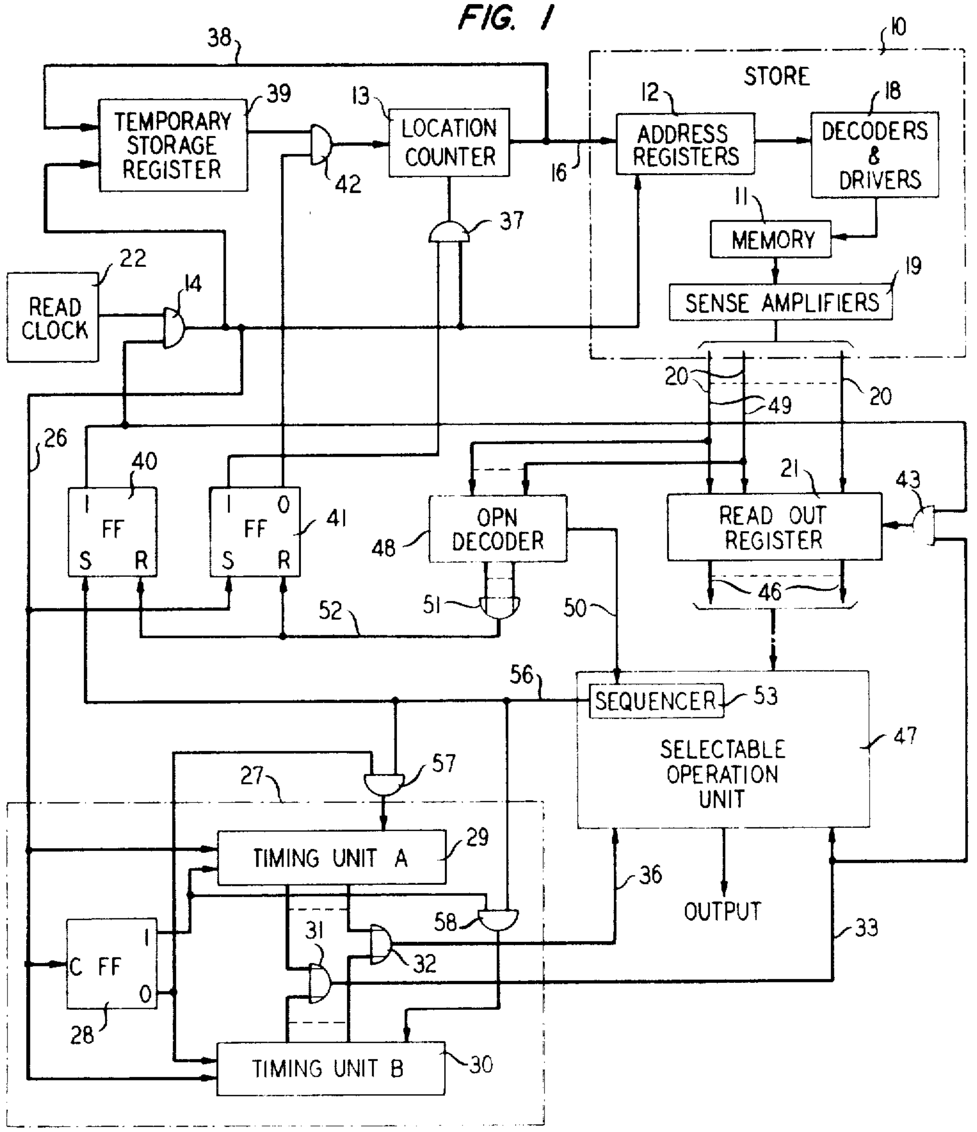
FIG. 1 is a simplified block and line diagram of a data-processing system incorporating the present invention.

FIG. 1 is a simplified block and line diagram of a data-processing system incorporating the present invention. Complete details of the system are not presented since their incorporation would unnecessarily complicate the drawings without contributing to an understanding of the invention, or to a realization of the advantages of the invention. The description which follows is carried forward in terms of a system including a store 10 having a nondestructive readout memory 11 for storing data and instructions for use in processing operations. In some applications the system may also include a further store (not shown) with an electrically changeable destructive readout memory for containing additional information utilized in processing operations. Each information word stored in memory 11 includes, along with the data or instruction bits, an operation code field containing signal bits that determine the type of operation to be executed by the system when such word is read out of the memory 11.

Store 10 includes an address register 12 which receives access signals in the form of address-defining signal bits from a location counter 13 by way of a circuit 16. The address register 12 advantageously includes circuits, not separately shown, which are operated to receive binary ONE-access signals from stages of counter 13 through time-gated input circuits into an array of monopulser circuits which drive decoders and drivers 18. The latter circuits generate drive signals on appropriate circuits for application to memory 11 to initiate readout therefrom. Monopulsers used in register 12 automatically terminate its output after a fixed interval so that additional timing is not required throughout the store. Readout signals from the memory 11 are coupled through sensing amplifiers 19 to output circuits 20 which couple such signals to a readout register 21.

The memory 11 can be of any desired type with any appropriate accessing circuits associated therewith. The circuits 12, 18, and 19 illustrated in FIG. 1 are provided for purposes of illustration only and are typical of circuits utilized in conjunction with semiconductor memories operated in a nondestructive readout mode. Store 10 is advantageously of the type represented by the MicroCELL memory system described in Section 3, No. 2, of a brochure 2910–046–56 of the Fairchild Memory Products Division of Fairchild Camera and Instrument Corporation.

Figure 2:
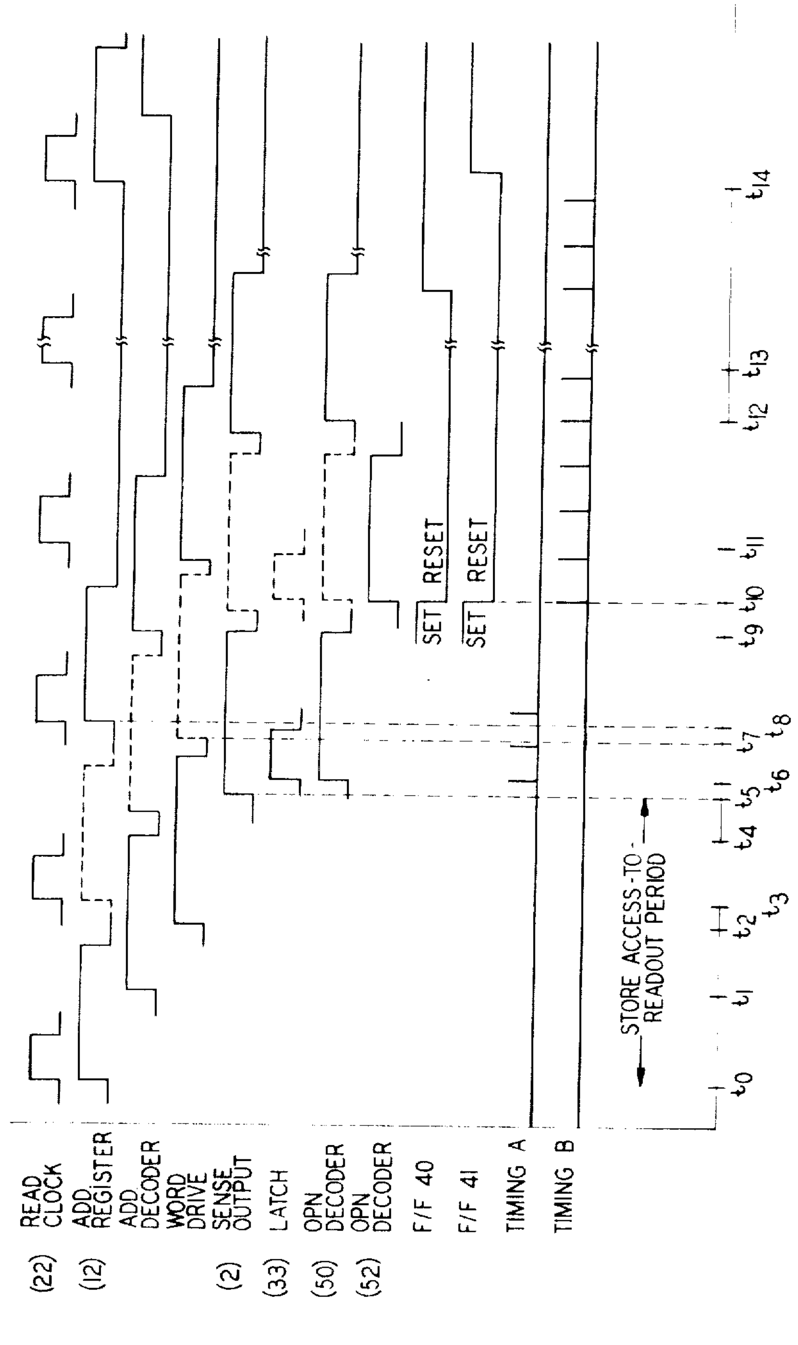
FIG. 2 is a timing diagram illustrating the operation of the store in FIG. 1.

Store 10 has a characteristic access-to-readout period which is, as shown in FIG. 2, the time interval between the time $t_0$ application of access signals to the address register 12 and the time $t_5$ initiation of corresponding readout signals from the sensing amplifier 19. The characteristic period represents the time required for signals to ripple through the store, and it allows the store to operate simultaneously in plural different phases in response to successive sets of access signals regardless of the address specified by each set. In accordance with one aspect of the present invention, access signals are cyclically applied to the store 10 from the location counter 13 at the pulse repetition rate of a read clock 22. Pulses from clock 22 advantageously have a duration about equal to the delay through two coincidence gates, and the period for the output from clock 22 is advantageously much shorter than the access-to-readout period of store 10. As shown in FIG. 2, the access-to-readout period includes nearly two clock periods, and the circuits of FIG. 1 are presented in that relationship. However, it will be understood by those skilled in the art that a greater number of clock periods can be incorporated in each access-to-readout period by appropriate modification of the logic to be described. The period of the clock 22 is also advantageously at least equal to the duration of the processor execution time for the word type in memory 11 which requires the shortest execution time of all words stored therein. It will be seen that although the invention is useful in any system where execution times are variable, the greatest benefit is realized in systems where the longtime average execution time is significantly less than the store access-to-readout period.

A first output pulse from clock 22 is coupled, at time $t_0$ in FIG. 2, from a normally enabled coincidence gate 14 for utilization at several points in the circuit of FIG. 1. A circuit 26 applies the clock pulses to a dual timing circuit 27 wherein they actuate the complementing input connection of a flip-flop circuit 28 to cause that circuit to change from one of its two stable states to the other in response to each clock pulse. The ONE and ZERO outputs of the flip-flop circuit 28 are connected to pulse steering input connections of an A-timing unit 29 and a B-timing unit 30, respectively, for steering clock pulses to the units 29 and 30 alternately. In each timing unit the clock pulses are utilized to trigger an oscillator (not shown) for driving a ring counter (not shown) in a manner which is well known in the art for producing A and B-timing pulse chains as shown in FIG. 2. Within a timing unit, circuits applying a clock pulse to the oscillator are advantageously arranged to have a delay corresponding to the access-to-readout period of store 10 so that the first timing chain pulse corresponding to a particular clock pulse appears just after the store readout corresponding to the same clock pulse begins.

The spikes from the ring counter stages trigger monostable circuits (not shown) for fixing appropriate durations for the various timing outputs. Such timed outputs of the respective ring counter stages of the timing units 29 and 30 are utilized for enabling various circuits throughout the data-processing system in appropriate sequence as is well known in the art. For purposes of illustration, only two such outputs are shown in FIG. 1. Corresponding outputs of the two timing units are applied through OR gates such as the gates 31 and 32 which couple the enabling signal to the appropriate processing system circuit. Thus, the output lead 33 of OR-gate 31 carries an enabling, or latch, signal that is coupled through a gate 43 for allowing register 21 to receive store readout signals at certain times but to be otherwise insensitive to such signals. Similarly, an output circuit 36 of gate 32 carries an enabling signal for another circuit, and other timing unit output circuits (not shown) also similarly provide enabling signals in sequence. Each timing pulse train lasts for a period longer than a clock period, unless sooner terminated, in order to accommodate the longest anticipated execution time. Thus, the A and B-timing unit actuations, including the mentioned actuation delay and the subsequent timing pulse train, at least partially overlap in a time sense.

The clock pulse output of coincidence gate 14 in FIG. 1 at time $t_0$ is also applied to the store 10 for actuating that store in one of its multiple, simultaneous, operation sequences as hereinbefore noted. The same clock pulse is further coupled through a normally enabled coincidence gate 37 to advance the location counter 13 for the case in which successive addresses in a regular sequence of addresses in memory 11 are to be interrogated. In most cases, the inherent delay in advancing counter 13 is sufficient to permit the contents before advance to be transferred by the same clock pulse to register 12 without adverse race effects. The output of counter 13, in addition to being applied to the address register 12, is also coupled through a circuit 38 to clock-gated inputs of a temporary storage register 39 where it overwrites any previous information contained therein. Here again, the preadvance information is transferred while counter 13 is being advanced.

Two additional flip-flop circuits 40 and 41 normally rest in their set states and provide binary ONE-output signals for enabling the gates 14, 37, and 43. The binary ZERO-output of the flip-flop circuit 41, in the set state of that flip-flop, disables a further coincidence gate 42 which otherwise couples the output of temporary storage register 39 to location counter 13.

Address information stored in register 12 at time $t_0$ initiates address decoding at time $t_1$, and thereafter at time $t_2$ a word drive pulse is applied to memory 11. Corresponding output begins to appear on circuits 20 at time $t_5$; and upon the occurrence at time $t_6$ of a latch pulse, the signals on circuits 20 are registered in readout register 21. However, in the meantime, a second clock pulse at time $t_3$ initiates the registration of the incremented contents of counter 13 in address register 12 to start a new word drive at time $t_7$. (Counter 13 incrementing had been initiated by the clock pulse at time $t_0$, the same pulse which had initiated the transfer of the previous contents of the counter to register 12.) Response to the second, or $t_3$, clock pulse is indicated by broken lines in FIG. 2.

The time $t_6$ readout from store 10 is temporarily stored in the register 21 at the same time that new access information is being stored in address register 12. Information states in register 21 are coupled through circuits 46 to a selectable operation unit 47 of the data-processing system. In the unit 47 various logic and arithmetic operations can be carried out as selected by the output of an operation decoder 48 which is responsive to operation code field output bits on circuits 49 of the output circuits 20 from store 10. Decoder 48 functions in the usual manner for such circuits to develop a single output signal, e.g., at time $t_6$, on a unique circuit for each one of a predetermined plurality of input signal permutations on the circuits 49 and defining the various operation codes utilized in the processing system. All of those unique circuits are schematically represented by a circuit 50 coupling the decoder to the operation unit 47. A sequencer 53 in unit 47 includes plural selectable sequencing circuits selectively actuated by the decoder 48 signal to cooperate with timing signals from circuit 27 for carrying out the directed operation. The sequencing circuits are advantageously coincidence gates actuated as aforesaid to initiate operations such as, for example, addition or comparison. Alternatively, the gates control counters for sequencing series of events for more complex operations. Illustrative digital logic modules commercially available for all such circuits are described in "IC-Digital Logic Modules—T-Series—Description and Specification," Revision 4, May 1968, copyright by Scientific Data Systems, Inc. Also depicted in the module book are flip-flop circuits, counters, registers, decoders, clock drivers, and a clock oscillator with associated countdown chain.

When an operation requiring execution time less than a clock period is to be performed in unit 47, the latch signal on circuit 33 is coupled, in cooperation with sequencer 53, through unit 47; and its trailing edge is used to apply an "operation complete" signal to a circuit 56. An example of this type of short operation is one wherein data is simply read into unit 47. The "complete" signal is utilized to reset the timing unit which initiated it as determined by the state of flip-flop 28 coupled through gates 57 and 58. In the meantime, however, the second clock pulse at time $t_3$ will have initiated operation of the other timing unit in overlapping time phase to produce the $t_{10}$ latch pulse for catching the store readout corresponding to the clock pulse at time $t_3$. This overlapping operation continues cyclically without interruption as long as decoder 48 detects no operations requiring more than a clock period for execution. Consequently, the relatively long characteristic access-to-readout period of store 10 is no impediment to rapid execution of a series of processor operations which are shorter than a clock period. A single timing unit, rather than the dual units 29 and 30 is all that is needed if all execution times are so long, and of such type, that there is no chance to receive a new store readout during the ending time of a current operation.

It was hereinbefore noted that the various operations that can be selected for performance in the processing system require different time intervals for execution, with the shortest of those intervals being no greater than the period of the output from the clock 22. In accordance with one aspect of the present invention, certain of the unique outputs from decoder 48, and corresponding to processing operations requiring an execution period which is longer than the period of the clock 22, are collected through an OR-gate 51 and applied, also at time $t_6$, on a circuit 52 to reset the flip-flops 40 and 41. In the present description it is now assumed that the operation initiated by the $t_3$ clock pulse will require execution time longer than a clock period, and FIG. 2 shows the corresponding decoder output on circuit 52 starting at time $t_{10}$. Gate 14 is disabled upon the resetting of flip-flop 40, and no further clock pulses can reach timing circuit 27, store 10, location counter 13, or register 39. Similarly, the gate 43 is disabled so that the readout register 21 is nonresponsive to any other changes in the output signals on the circuits 20 from store 10. Thus, the store clock is stopped and the supply of access signals to the store is suspended.

The resetting of flip-flop 41 at time $t_{10}$ applies an enabling signal to the gate 42 to cause the information stored in the temporary storage register 39 to overwrite the contents of the location counter 13. That information is the time $t_8$ address information which had been stored in register 39 when the $t_8$ clock pulse opened its input connections and incremented counter 13.

It was previously noted that sequencer 53 produces an output on circuit 56 upon completion of an operation execution sequence. In fact, for sequences that are longer than a clock period, and in which the final termination time is not data dependent, e.g., in many processors a shift operation has a data-dependent duration, the "complete" signal is advantageously produced prior to the termination of the execution sequence by one period of the clock 22. Whenever a "complete" signal appears on circuit 56, it sets the flip-flop 40, if that flip-flop is then in its reset state, for reenabling gates 14 and 43. This action restarts the clock for store 10 and permits the readout register 21 to be enabled at the appropriate time by a timing output from circuit 27. On the first clock pulse following the enabling of gate 14, e.g., at time $t_{14}$, the timing circuit 27 resumes operation; and the time $t_8$ address information in counter 13 is gated into address register 12 to initiate a new cycle of store 10 operation. This $t_{14}$ clock pulse also sets flip-flop 41 for enabling gate 37 so that the next succeeding clock pulse (not shown) increments location counter 13.

Operation of store 10 continues with intermittent suspensions of clock and address information for accessing to accommodate various word execution times and to achieve an effective store access rate that is lower than that which would otherwise be possible. The longtime average access rate is thus controlled by the frequency of suspensions directed by "-complete" signals on circuit 56. The cost of the faster access is a temporary storage register of address bit capacity, a comparatively small number of flip-flops and logic gates of single-bit capacity, and in some cases a timing unit duplication. The remaining apparatus, e.g., store 10, counter 13, register 21, decoder 48, operation unit 47, and timing unit 29, is that which is normally employed in any processing system.

Although the present invention has been described in connection with a particular application thereof, it is to be understood that additional applications and modifications which will be obvious to those skilled in the art are included within the spirit and scope of the invention.

What is claimed is:

1. In combination, a store for information signal representations available for readout for processing and requiring time intervals of different durations for such processing, said store having a characteristic access-to-readout period which is longer than at least a first portion of said time intervals, means for supplying successive sets of access signals to actuate corresponding information signal readouts from said store, said supplying means including means for cyclically applying said sets of access signals with a period that is less than the duration of said access-to-readout period, and means, responsive to a readout from said store, for controlling the average rate of application of said access signals in accordance with said processing interval durations, said controlling means including means for interrupting operation of said cyclic applying means.

2. The combination in accordance with claim 1 in which said access-to-readout period is shorter than a second portion of said intervals, and said controlling means includes means responsive to a readout of signals requiring a processing interval of said second portion for suspending operation of said applying means at least until a time prior, by said access-to-readout period, to completion of processing of the last-mentioned signals.

3. The combination in accordance with claim 1 in which said access-to-readout period is shorter than a second portion of said intervals, and said controlling means includes means responsive to a readout corresponding to signals requiring a processing interval in said second portion temporarily suspending operation of said applying means for a time interval longer than an interval of said first portion.

4. The combination in accordance with claim 3 in which said applying means includes means registering a set of access signals for application to said store and means storing access signals applied to said store within an access-to-readout period, and said suspending means includes means transferring the contents of said storing means to said registering means for use at the end of operation suspension.

5. The combination in accordance with claim 1 in which said controlling means comprises an information processor including an operations unit for executing a selectable one of plural different information processing operations, a decoder responsive to signals from said store selecting a unit operation to be executed with respect to such signals, and timing means controlling the sequential execution of the last-mentioned operation, and means coupling outputs of said decoder for predetermined ones of said operations to inhibit temporarily said supplying means for the duration of at least a predetermined part of the execution of each such operation.

6. The combination in accordance with claim 5 in which said timing means includes plural timing units, means actuating said units in recurring sequence, in response to each operation of said supplying means, to produce respective chains of timing signals for controlling said processor, actuations of said timing unit partially overlapping one another in a time sense.

7. The method of accessing an information store in a data-processing system and comprising the steps of cyclically applying access signals to the store with a period at least as long as the minimum instruction execution time for the processing system, detecting any store readout requiring an execution time longer than said minimum time, and inhibiting the further application of access signals at least until said minimum execution time prior to the completion of execution of the detected instruction readout.

* * * * *